United States Patent [19]

Vinesky et al.

[11] Patent Number: 4,770,048
[45] Date of Patent: Sep. 13, 1988

[54] FLOW METER SUPPORT AND RETAINER

[75] Inventors: Lawrence A. Vinesky, Phoenix; Walter G. Wunsch, Mesa, both of Ariz.

[73] Assignee: Flow Technology, Inc., Phoenix, Ariz.

[21] Appl. No.: 692,877

[22] Filed: Jan. 18, 1985

Related U.S. Application Data

[63] Continuation of Ser. No. 466,022, Feb. 14, 1983, abandoned.

[51] Int. Cl.⁴ .................................................. G01F 1/10
[52] U.S. Cl. .................................. 73/861.92; 384/215; 415/142; 415/219 R
[58] Field of Search ........... 73/861.83, 861.89, 861.91, 73/272 R, 861.92; 384/215; 415/142, 219 R

[56] References Cited

U.S. PATENT DOCUMENTS

| | | |
|---|---|---|
| 2,270,141 | 1/1942 | Potter . |
| 2,299,406 | 10/1942 | Potter ............................... 73/861.92 |
| 3,318,642 | 5/1967 | Peterson ............................ 384/215 |
| 3,370,465 | 2/1968 | Belle .................................. 73/861.83 |
| 3,592,517 | 7/1971 | Harris .................................... 384/215 |
| 3,756,079 | 9/1973 | November ........................ 73/861.92 |
| 3,798,968 | 3/1974 | Harris ................................ 73/861.92 |
| 3,948,099 | 4/1976 | Geisow ............................. 73/861.92 |
| 3,999,885 | 12/1976 | Harris et al. ....................... 73/861.92 |

Primary Examiner—Herbert Goldstein
Attorney, Agent, or Firm—Christie, Parker & Hale

[57] ABSTRACT

A flow meter includes a flow channel having walls and defining a direction of flow. Stators are provided, having walls, disposed at least partially within the flow channel. A rotor is included for rotating with respect to the stator. A one piece retainer is provided for assisting in limiting axial rotor movement comprising a first pair of spaced apart wall portions for engaging the flow channel walls wherein each wall portion in the first pair of wall portions is located on a side of an axis opposite from the other. A second wall portion is located on the axis for engaging the stator wall wherein compression of each of the first pair of wall portions toward the axis results in a component of force being applied to the second wall portion along the axis.

5 Claims, 4 Drawing Sheets

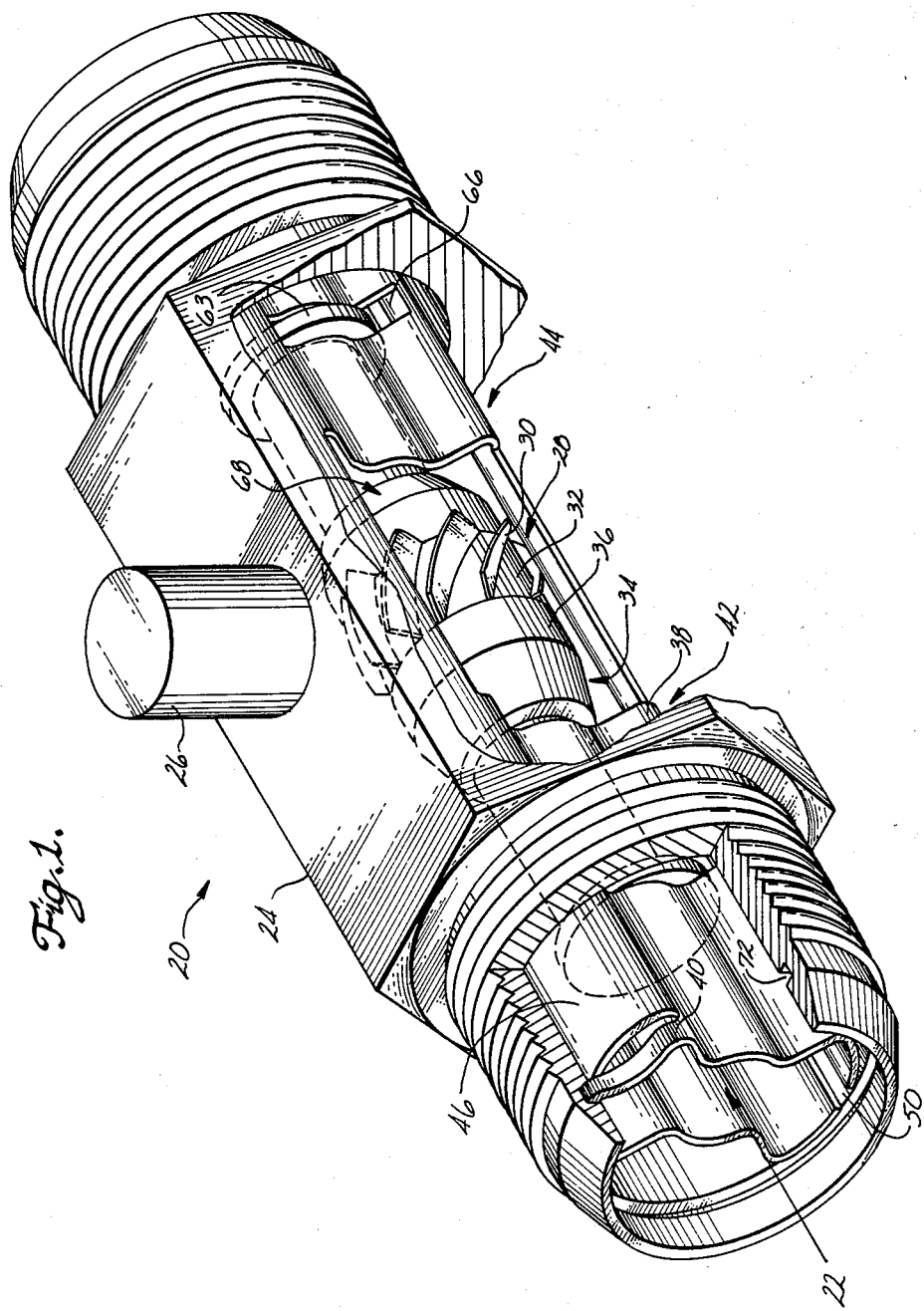

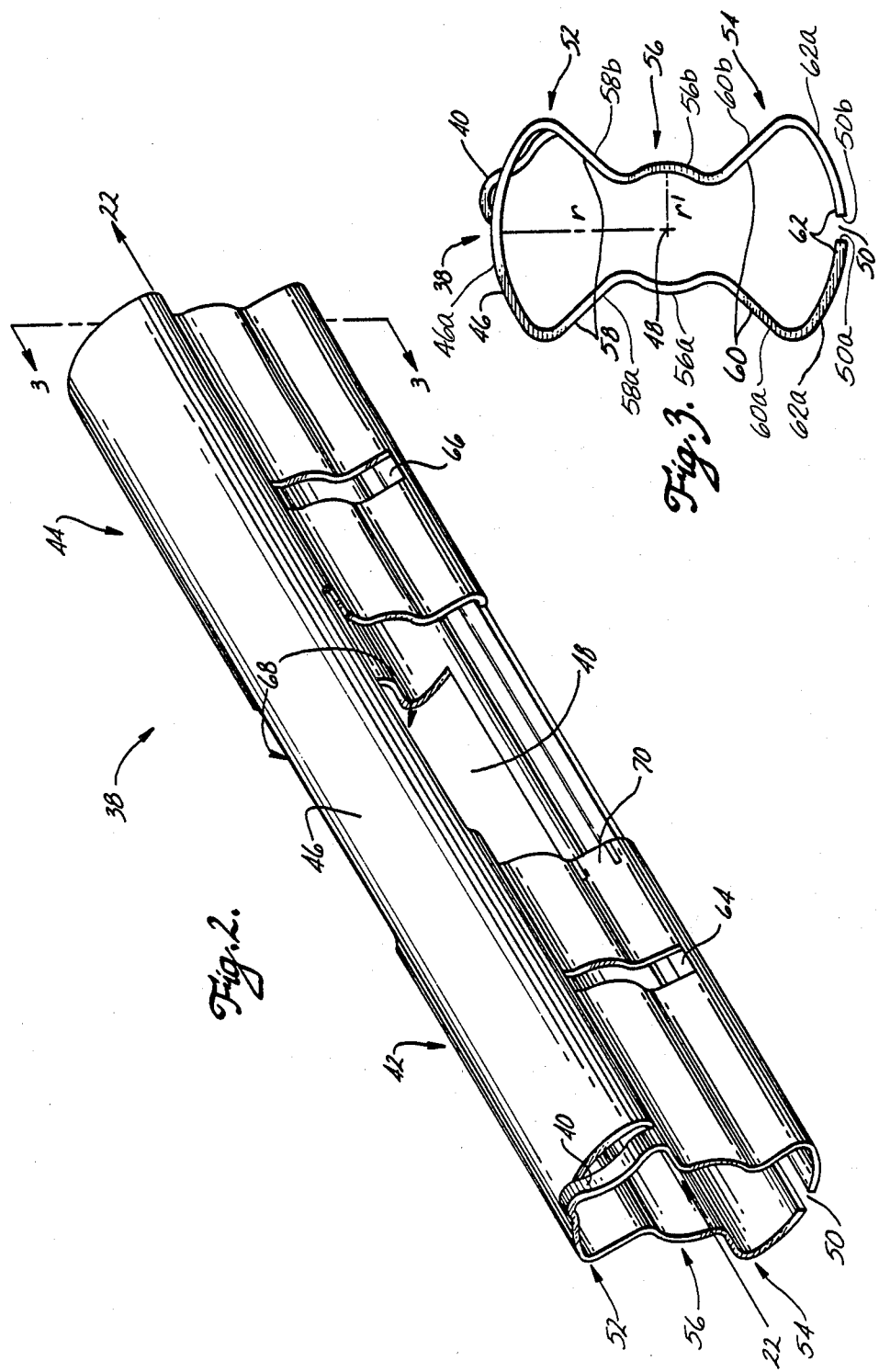

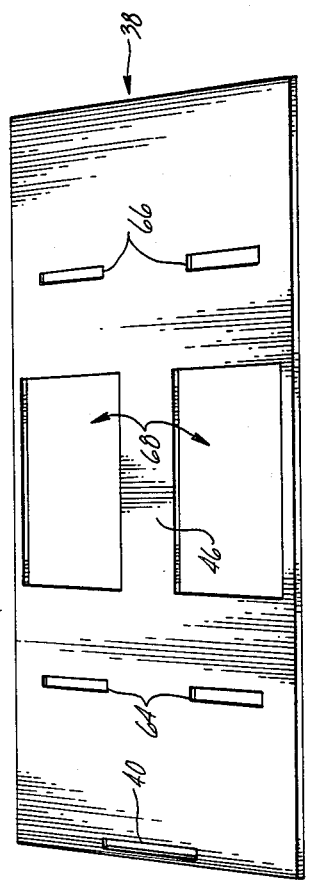
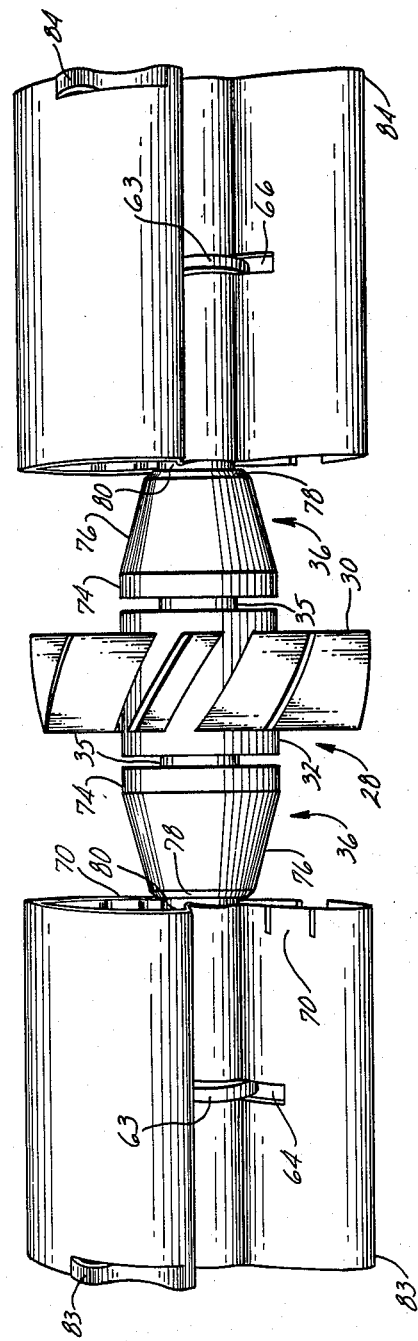

4,770,048

FLOW METER SUPPORT AND RETAINER

CROSS-REFERENCE TO RELATED APPLICATIONS

This is a continuation of application Ser. No. 466,022 filed Feb. 14, 1983, now abandoned.

BACKGROUND OF THE INVENTION

This invention relates to in-line flow meters and more specifically to retainer and support devices for in-line flow meters.

Flow meters have a range of applications such as in water meters for houses, meters for medical diagnostic instruments, meters for measuring fuel flow in airplanes and meters commonly known as anemometers. The principles underlying these various meters are often the same, though the structures are different. For example, the principle underlying the anemometer and the aircraft fuel flow meter is a rotor disposed in the fluid flow path turning on a stator mounted on a stationary member. The rotational velocity of the rotor constitutes a measure of the fluid flow parameter sought to be measured. Such is the general principle disclosed in Potter, U.S. Pat. No. 2,270,141.

Potter teaches a rotor comprising a shaft split longitudinally in the middle so that the split portions, when spread apart and twisted slightly, form two spaced apart arcuate vanes, the rotor being supported by a stator. The stator is held stationary at each end about four sides of the stator by retaining means comprising three or four resiliently deformable cylinders. The cylinders are retained at their outer surfaces by the walls of the flow channel.

The vanes of the rotor contain a bar magnet which produces a varying magnetic field when the flow of the fluid past the vanes causes the rotor to spin. Disposed about the outside of the flow channel walls at the point along the length of the channel where the vanes are located is means for sensing the rate of change of the magnetic field within the flow channel. The sensing means is then connected by a conductor to a meter or dial calibrated to indicate the parameter of fluid flow sought to be measured. The Potter flow meter is similar in theory to the flow meter contemplated for use with the present invention.

The retaining means of Potter are easy to manufacture but, because of the number of cylinders used at each stator, the apparatus is difficult to assemble. Furthermore, the type of bearings used to support the rotor may dictate the use of a different retaining means.

Another prior art device is used in conjunction with a modified form of the above-described flow meter. The modified flow meter assembly comprises a flow meter housing to be placed in-line with a longitudinal flow channel such as a pipe or tube, and a magnetic field sensor housing attached to the outer surface of the housing whereby a conductor can be attached to the housing for connecting a remote meter or dial to a magnetic field sensor within the sensor housing. Within the flow meter housing, a rotor is rotatably mounted on longitudinally extending stator means parallel to the fluid flow and within the flow channel. The stator means has oppositely facing ends in the shape of nose cones. The prior art device employs a spoked hub to retain and support the stator means, and thereby the rotor, within the flow meter housing. The retainers are in turn secured within the flow meter housing by annular retainer spring clips, one at each end of the flow meter housing, preventing the retaining and supporting means from being moved in a direction away from the rotor and therefore out of the flow meter housing. This form of the retainer is relatively difficult and costly to fabricate because it must be machined. Because the support must be machined, each support is inherently different from the previous one, to varying degrees. Therefore, flow resistance varies from unit to unit.

SUMMARY OF THE INVENTION

The present invention includes a flow meter comprising a flow channel with walls, stator means within the flow channel oriented such that the major axis of the stator means is parallel to the direction of fluid flow, rotor means for rotating on the stator means in response to fluid flow, retaining means retaining and supporting the stator means such that the rotor remains longitudinally stationary with respect to the flow channel comprising resiliently deformable means exerting a squeezing force on the stator means and a dilating force against the walls of the flow channel.

In one embodiment of the invention, the retaining and supporting means is formed from a sheet of spring steel i.e. sheet metal symmetrically about a central longitudinal spine with various convolutions on each side of the spine, the first convolution and the third convolution substantially constituting the dilating means and the second convolution substantially constituting the squeezing means. Such retaining and supporting means is easily and economically manufactured because it can be stamped from stock material and presents a minimal hindrance to fluid flow. Additionally, the cross-sectional area presented to oncoming fluid is less for the stamped support than for the machined support, and is also more uniform along the length of the support. Another benefit exists in the presence of vanes formed by the shape of the support serving to straighten flow past the meter. Furthermore, such retaining and supporting means is easily inserted together with the stator and rotor into a fluid flow channel.

In a second feature of the invention, the retaining and supporting means includes a retaining mechanism or clip at one end for engaging a circular groove in the flow channel wall such that movement of the retainer and thereby the stator and rotor is precluded. A further feature of the invention is linearity control trim tabs adjacent the rotor which can be adjusted toward or away from the central axis of fluid flow to ensure maximum linearity of meter response to fluid flow changes.

In another embodiment of the invention, the retaining and supporting means comprises a pair of separate retainers, one for each end of the stator. The shape of each retaining and supporting means is substantially the same as the shape of the single retaining and supporting means. However, having two supporting and retaining means in such a fashion allows easier assembly of the flow meter. This embodiment may also include the retaining mechanism and the flow linearity control trim tabs as mentioned above.

BRIEF DESCRIPTION OF THE DRAWINGS

The features of the specific embodiments considered to be several of the best arrangements of the device are illustrated in the drawings, in which:

FIG. 1 is a perspective view of a flow meter embodying the devices of the present invention;

FIG. 2 is a perspective view of the one-piece retaining and supporting device embodying the present invention;

FIG. 3 is a cross-sectional view of the device of FIG. 2 taken along line 3—3 of FIG. 2;

FIG. 4 is a perspective view of the retaining and supporting device prior to formation into the form shown in FIG, 2;

FIG. 6 is a perspective view of the two-piece retaining and supporting device suspending the stator and rotor means;

DETAILED DESCRIPTION OF THE SPECIFIC EMBODIMENTS

Figure 5:
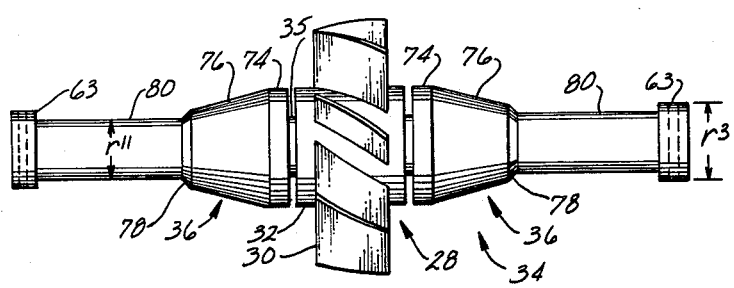
FIG. 5 is an elevation view of the rotor and stator means used with the devices embodying the present invention.

FIG. 1 shows a flow meter assembly 20 designed to be placed in line with a flow channel, such as a pipe (not shown), and extending longitudinally substantially parallel to the flow channel and to the directional line of fluid flow 22. Flow meter assembly 20 includes a longitudinal flow meter housing 24 of inside diameter D to be placed in-line with the flow channel and a magnetic field sensor housing 26 attached to the surface thereof to facilitate connection of a remote meter, dial or other indicator to the meter housing 24. Contained within the cylindrical bore of flow meter housing 24 is a rotor 28 disposed to rotate, in response to longitudinal fluid flow, about an axis parallel to the line of fluid flow 22. Rotor 28 comprises vanes 30 made of a ferromagnetic material and distributed about a hub 32 such that the fluid flow in the direction indicated at 22 imparts rotation to rotor 28 creating a changing magnetic field sensed by a magnetic field sensor (not shown) within magnetic field sensor housing 26. The magnetic field sensor is connected to a meter or dial (not shown) calibrated to indicate the desired flow parameter.

Rotor 28 is rotatably mounted on stator means, generally depicted in FIG. 1 at 34. Stator means 34 includes a longitudinal shaft 35 (FIG. 5) oriented parallel to the direction of fluid flow 22 and about which rotor 28 rotates on bearings (not shown). Stator means 34 also includes a shaft support or cone 36 at each end of the rotor 28 and enclosing a respective end of the shaft. Each cone 36 extends longitudinally away from each end of the rotor along line 22.

Flow meter assembly 20 also includes stator retaining and supporting means 38 extending longitudinally within flow meter housing 24 for supporting stator means 34 and rotor means 28 within meter housing 24. Retainer 38 includes a clip or retaining mechanism 40 for holding retainer 38 within the bore of meter housing 24.

FIGS. 2 and 3 show in detail stator retaining and supporting means in the form of retainer 38. Retainer 38 comprises a left end 42 substantially to the left of rotor 28 as seen in FIG. 1, a right end 44, substantially to the right of rotor 28 as seen in FIG. 1, and an arcuate elongate spine 46 extending from end to end of retainer 38. In general, the specific embodiment of FIG. 2 has left end 42 and right end 44 as mirror images of each other about a plane through a geometric center 48 of the retainer 38 transverse to the retainer 38. Similarly, a vertical plane parallel to fluid flow 22 and bisecting retainer 38 would produce substantial mirror images. Furthermore a horizontal plane extending parallel to fluid flow 22 and through geometric center 48 would generally bisect retainer 38 into top and bottom portions producing substantial mirror images except for a scission 50 defined by first and second spaced apart ends 50a and 50b extending the length of retainer 38 opposite spine 46, to be described below.

The shape of retainer 38 can be more readily perceived by viewing a transverse cross section of the retainer 38 in the direction shown by line 3—3 of FIG. 2 and shown in FIG. 3. In cross section, retainer 38 has various convolutions and is substantially in the form of a bowtie shown in FIG. 3 standing on end having top and bottom parts in the form of a first side 46a for contacting one portion of the flow channel wall and a second side 62a for contacting a second portion of the flow channel walls. The top and bottom parts include outer portions substantially arcuate with a radius of curvature r, and have a center portion connecting the top part and the bottom part comprising oppositely facing, substantially vertical semicircles of radius r', where radius r' is less than radius r. To put it another way, the cross section of retainer 38 is in the form of upper and lower isosceles triangles 52 and 54, respectively, whose respective angles formed by the two equal sides are oppositely facing, whose respective third sides opposite the angles are arcuate and oppositely facing having radius r (where D is approximately twice r) and where a circle 56 of radius r' less than r is superimposed on the triangles 52 and 54 at their junction such that radius r and radius r' have common origins on a geometric center 48. In such a form, retainer 38 is symmetric about vertical and horizontal planes passing through the center or origin of the radii r and r'.

The structure of retainer 38 comprises for the most part upper and lower triangular portions 52 and 54, respectively, and central semicircular portions 56 constituting means for interconnecting the first and second sides, all extending longitudinally the length of retainer 38. Upper triangular portion 52 is integral with the upper ends of central semicircular portions 56. The lower ends of semicircular portions 56 are integral with lower triangular portion 54. The semicircular portions include a first arcuate portion 56a and a second arcuate portion 56b.

Upper triangular portion 52 is composed of spine 46, formed from the third side of the upper isosceles triangle and extending longitudinally the length of the retainer 38, and upper radial wall portions 58, formed from the two equal sides of the upper isosceles triangle and substantially perpendicular to spine 46 at their respective points of intersection with spine 46. The wall portions comprise means in the form of a flange portion 58a for joining the first side to the first arcuate portion and means in the form of a flange portion 58b for joining the first side to the second arcuate portion. Wall portions 58 extend at their upper ends substantially radially from spine 46 inwardly toward the common origin and preferably at right angles to each other.

At a distance r' from the common origin of r and r', each of the lower reaches of wall portions 58 substantially perpendicularly intersect oppositely facing central semicircular portions 56 formed from the portions of the circle of radius r' superimposed on the upper and lower isosceles triangles at their junction with the latter.

Lower triangular portion 54 includes lower radial wall portions 60 formed from the two equal sides of the lower isosceles triangle extending perpendicularly at their convergent ends from the lower edges of the respective central semicircular portions 56 outward at right angles to each other from the common origin to respective lower arcuate portions 62 formed from the third side of the lower isosceles triangle. The lower radial wall portions comprise means in the form of a flange portion 60a for joining the second side to the first arcuate portion 56a and means in the form of a flange portion 60b to joining the second side to the second arcuate portion 56b. Upper and lower radial portions 58 and 60, respectively, would intersect at right angles if extended inward to a common center 48. Lower arcuate portions 62 are substantially perpendicular to respective lower perpendicular wall portions 60 at the respective points of interaction with the latter and extend inward along an arc of radius r toward each other. Lower arcuate portions 62 extend longitudinally the length of retainer 38 and have radii of curvature r. Lower arcuate portions 62 complement spine 46 but for a gap in the form of scission 50 longitudinally bisecting the retainer 38 into two halves symmetric about a vertical plane through geometric center 48 parallel to fluid flow. Each side of the semicircular portions 56 of the retainer 38 extends in a convex arc from the respective upper radial wall portions 58 to the lower radial wall portions 60.

Retainer 38 of FIG. 2 preferably has two pairs of apertures comprising left stator support locking slot pair 64 and right stator support locking slot pair 66 for engaging outwardly extending flanges 63 (FIG. 5) on extensions of cones 36. Left locking slots 64 are located approximately midway between the end of left end 42 and the geometric center 48 and right locking slots 66 are located approximately midway between the end of right end 44 and the geometric center 48. The locking slots extend vertically downward from respective parts of the upper radial wall portions 58 through central semicircular portions 56 and into the respective parts of lower radial wall portions 60.

In order to accommodate rotor means 28, retainer 38 has rotor openings 68 disposed about each side of spine 46, and separating left end 42 from right end 44. Rotor openings 68 extend from respective sides of spine 46 to the lowest portion of lower radial wall portions 60. Therefore, if rotor means 28 and stator means 34 are to be inserted within retainer 38, retainer 38 must be dimensioned to allow rotor means 28 to extend from geometric center 48 to just within the underside of spine 46 in one direction and to just within scission 50 in the other direction. Therefore, the radius of the rotor is necessarily less than radius r of FIG. 3. In final assembly, rotor means 28 is disposed about stator means 34, and retainer 38 is disposed within flow meter housing 24 parallel to flow 22.

To optimize linearity of response of the meter or indicator during various flow conditions, retainer 38 of FIGS. 2 and 3 has linearity adjusting trim tabs 70 on the upper radial wall portions 58 and lower radial wall portions 60 on the left end 42 adjacent rotor openings 68. These are placed preferably upstream from rotor means 28 in order to affect the flow as the fluid passes rotor means 28. These can be adjusted as desired to achieve optimum linearity.

As mentioned above, retainer 38 has an S-shaped retaining mechanism in the form of a clip 40 in the upstream end of retainer 38 which extends outwardly from spine 46 to fit into a perimetrical groove 72 (FIG. 1) on the inside of flow meter housing 24. Retaining mechanism 40 fits within groove 72 to maintain retainer 38 and rotor means 28 in a fixed axial position relative to flow meter housing 24.

Significantly, retainer 38 is preferably fabricated from a rectangular sheet of spring material. Retainer 38 is stamped from a rectangular sheet, as shown in FIG. 4, to obtain an inchoate retaining mechanism 40, left and right stator support locking slots 64 and 66, respectively, a spine 46 and rotor openings 68. Subsequent to stamping, retainer 38 is rolled into the form shown in FIGS. 2 and 3. Clip 40 is formed prior to insertion of the flow meter combination into the housing 24.

The rotor means 28 and stator means 34 to be used in conjunction with the aforementioned embodiment of retainer 38 in FIG. 2 is shown in FIG. 5. Rotor means 28 is mounted coaxially with respect to stator means 34 and is mounted at the midpoint thereof. Rotor means 28 includes vanes 30 and rotor hub 32, the substantial portion of the vanes 30 and hub 32 having a radius $r_1$. Radius $r_1$ is less than radius r, the distance from the geometric center 48 to spine 46 of retainer 38, for example. Rotor means 28 rotates about a shaft 35 which in turn is supported on each end by cones 36. Preferably, the outside diameter of the upstream edge of hub 32 is slightly less than the maximum outside diameter of the adjacent cone. Each cone 36 includes a right circular cylindrical portion 74 immediately adjacent the rotor hub 32 and a nose cone portion 76 converging from the cylindrical portion 74 to a more sharply convergent end portion 78 further removed from rotor hub 32. The cones are preferably shaped to ensure laminar flow at the rotor portion of the assembly, and also to minimize the force of the fluid flow on the downstream cone. The final convergent end portion 78 terminates in a cylindrical portion 80 of radius r" slightly greater than r'. Cylindrical portion 80 extends longitudinally from cone portion 76 to an end flange portion 63 of radius $r_3$, where $r_3$ is greater than r". Preferably, the length of each cone is in a 2:1 ratio to the diameter of the cylindrical portion 80. Thus, stator means 34 includes a shaft 35, a cone section 36 and a flanged cylindrical portion 80 retained by retainer 38. Therefore, when the cylindrical portion 80 is inserted in retainer 38, it is enclosed and held via spring compression by the central semicircular portions 56 of radius r' and securely held thereby since r" is slightly greater than r'.

As stator means 34 is inserted into retainer 38, the cylindrical portions 80 of stator means 34 are held in retainer 38 by spring compression forces and by the interlock of flanges 63 with locking slot pairs 64 and 66. As a result, rotor means 28 and stator means 34 are rigidly suspended by retainer 38 within flowmeter housing 24 and axial movement of rotor means 28 is thereby precluded. Furthermore, the diameter D is now slightly less than twice radius r because radius r has increased upon insertion of the cones of radius r" into retainer 38.

In final assembly, the rotor 28, stator 34, and retainer 38 combination is held within flowmeter housing 24 by the combination of clip 40 engaging groove 72 in flowmeter housing 24 and by the spring expansion forces created in retainer 38 when the combination is inserted into the flowmeter housing 24. The expansion forces are created due to the fact that the inside diameter D of flowmeter housing 24 is slightly less than twice the radius r with the cones in place.

Figure 7:
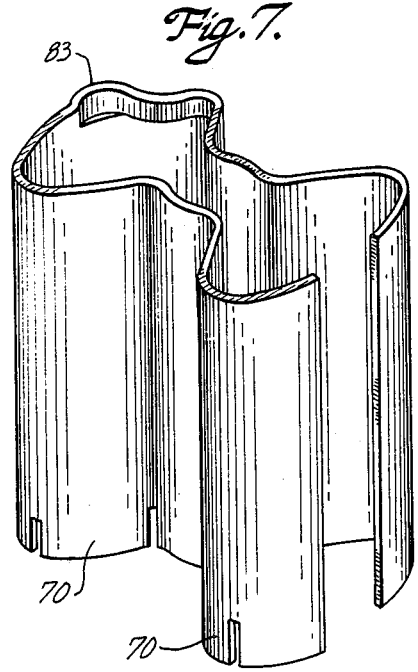
FIG. 7 is, a perspective view of one of the retaining and supporting means of FIG. 6.

Another embodiment of flow meter assembly 20 shown in FIGS. 2 and 3 is the combination shown in FIG. 6 of rotor means 28, stator means 34 and a two-piece retainer 38. The shape of the two-piece retainer 38 is the same as for the one piece. However, in this embodiment, the two-piece retainer comprises a left retaining mechanism 83 on the upstream end of the left piece and a right retaining mechanism 84 on the downstream end of the right piece. Linearity adjusting trim tabs 70 are placed on the downstream portion of the left piece. Trim tabs 70 are placed on the upper radial wall portions 58 and lower radial wall portions 60 (FIG. 7). This embodiment in FIG. 6 of the rotor means 28, stator means 40, and the retainer combination is significant in that it also contributes to linearity of meter response to changes in flow conditions.

Figure 8:
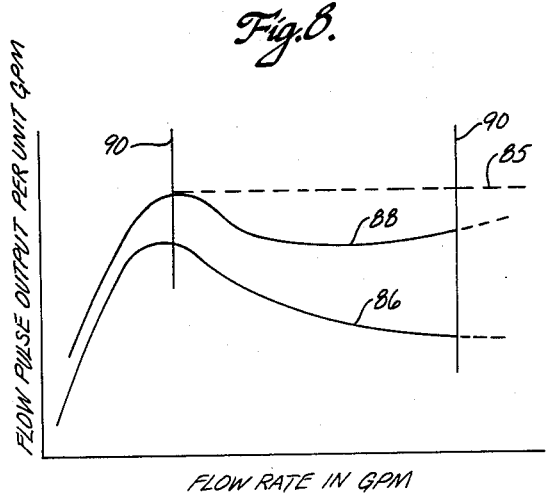
FIG. 8 is a graph of the relationship between flow pulse output per unit volume as a function of flow rate in gallons per minute.

The significance of the linearity adjusting trim tabs 70 is shown in the graph of FIG. 8. The graph is an empirical plot of flow pulse output per unit volume per unit time as a function of flow rate in gallons per minute. The ideal response is represented by dashed line 85 and shows a linear relationship between the flow pulses produced at the magnetic field sensor and the actual flow conditions to be measured. The lower curve 86 shows the relationship for a retainer without trim tabs and the upper curve 88 shows the curve for a retainer with trim tabs in position for optimum linearity. Vertical lines 90 show the limits of the nominal flow range for a given flow system. Curve 88 shows that the use of linearity adjusting trim tabs 70 enhances the linear response of the meter to flow changes by more closely approximating ideal conditions. The trim tabs are bent in such a way that the flow impacts the rotor vanes in a direction more nearly normal thereto.

The assembly of the flowmeter apparatus is accomplished first by spreading scission 50 of retainer 38 and inserting stator means 34 comprising nose cone portions 76 and cylindrical portions 80. Keeping the scission 50 separated, the assembled rotor 28, shaft 35 and appropriate bearings are then inserted between stator means 34. The shaft 35 must be twisted or walked into cone portions 76 because the length of shaft 35 is preferably slightly greater than the distance between the inside surfaces of cone portions 76. Thereafter, the rotor 28, stator 34 and bearings (not shown) are adjusted as desired with an adjust screw (not shown) setting the bearing tolerances. Retainer 38 is then allowed to return to a compressive configuration. With the rotor 28 and stator means 34 inserted, the retainer 38 is in a slightly expanded configuration because the radius r″ is slightly greater than radius r′. Therefore, stator means 34 is retained and supported by retainer 38 via the compressive spring forces and preferably by the interlocking flanges 63 and the respective locking slot pairs 64 and 66.

The meter and retainer 38 combination is then inserted into flowmeter housing 24 by squeezing the lower triangular portion 54 and working the combination into flowmeter housing 24. Upon squeezing, upper and lower radial portions 58 and 60, respectively, flex so that the combination may be inserted into housing 24. As a result, the combination is retained in flowmeter housing 24 by a combination of expansive spring forces created in retainer 38 and by clip 40. The expansive forces in retainer 38 result from the fact that the inside diameter D of flowmeter housing 24 is slightly less than twice the radius r of retainer 38 with the cones in place. Therefore, when the lower triangular portion 54 is squeezed, the combination inserted into flowmeter housing 24 and the lower triangular portion 54 released, the expansive spring forces in retainer 38 force the convolutions of retainer 38 out to the inside walls of flowmeter housing 24. The several trim tabs 70 can be adjusted to optimize linearity of response of the meter or indicator to flow changes. Assembly and adjustment for the two-piece retainer is similar to the process described above.

The retainer 38 in the above-described embodiments provides an easily and inexpensively manufactured retainer and one that is easily assembled. The resulting flow meter provides optimum results in in-line flow measurements and represents a flow meter retainer which is a significant improvement over previous retainers.

It should be noted that the above are preferred configurations but others are foreseeable. The described embodiments of the invention are only considered to be preferred and illustrative of the inventive concept; the scope of the invention is not to be restricted to such embodiment. Various and numerous other arrangements may be devised by one skilled in the art without departing from the spirit and scope of the invention. For example, other shapes are foreseeable which would exert both a compressive force and a dilating force. Similarly, linearity may be achieved by molding the retainer differently without requiring trim tabs. The retaining mechanism or clips may also be varied in structure and method of application. Furthermore, the retainer need not be formed from a sheet but merely from a skeleton frame.

What is claimed is:

1. A flow meter comprising:
   a flow channel having walls and defining a direction of flow;
   stator means disposed at least partially within the flow channel;
   rotor means, for rotating with respect to the stator; and
   retaining means limiting axial rotor movement comprising means exerting a squeezing force on the stator means and dilating force against the walls of the flow channel wherein the retaining means in cross section is substantially in an outline of a bowtie having outer dimensions including ends and a center portion such that the furthest ends are bowed outward into arcuate portions each having a radius of curvature and the center portion is in the form of arcs of a circle of radius less than the respective radii of curvature of the arcuate portions.

2. A flow meter retaining element for use in a flow channel, having walls and defining a direction of flow, for retaining a flow meter in the flow channel having stator means disposed at least partially within the flow channel and rotor means for rotating with respect to the stator, the retaining element comprising means for exerting a squeezing force on the stator means and a dilating force against the walls of the flow channel wherein the retaining element in cross section is substantially in an outline of a bowtie having outer dimensions including ends and a center portion such that the furthest ends are bowed outward into arcuate portions having a radius of curvature and the center portion is in the form of arcs of a circle of radius less than the respective radius of curvature of the arcuate portions.

3. A retaining spring for retaining a flow meter within a flow channel comprising a metal of one-piece construction having a uniform thickness and wherein the metal comprises a first arcuate side defining an angle of approximately 90° for contacting one portion of a wall of a flow channel, a second arcuate side defining an angle of approximately 90° for contacting a second portion of the flow channel wall, wherein the first and second sides are substantially oppositely facing along a first line, third and fourth arcuate portion substantially oppositely facing with respect to each other along a second line, a first flange portion coupling the first end of the first arcuate side with a first end of the first arcuate portion, a second flange portion for coupling a second end of the first arcuate side with a first end of the second arcuate portion, a third flange portion for coupling a first end of the second arcuate side to a second end of the first arcuate portion and a fourth flange portion for coupling a second end of the second arcuate side to a second end of the second arcuate portion.

4. The retaining spring of claim 3 wherein separation of the first and second arcuate portions produces an expansive force in one of the first and second arcuate sides.

5. A flow meter comprising:

a flow channel having a flow-defining walls;

stator means having first and second longitudinally spaced apart end lying in the channel;

a turbine rotatably supported between the ends of the stator means;

means for securing the first end in the channel against axial and rotational motion with respect to the channel;

a retaining spring in a one-piece construction bearing outwardly against the walls of the channel and inwardly against the second end to secure the second end in the channel against axial and rotational motion with respect to the channel and to couple the second end with the walls, the retaining spring being the sole means of said coupling of the second end; and wherein the first end securing means comprises part of the retaining spring bearing outwardly against the walls of the channel and inwardly against the first end to secure the first end in the channel against axial and rotational motion with respect to the channel and to coupled the first end with the walls, the retaining spring being the sole means of said coupling of the first end.

* * * * *